(12) United States Patent
Behdad et al.

(10) Patent No.: US 8,362,956 B2
(45) Date of Patent: Jan. 29, 2013

(54) ELECTRICALLY SMALL, SOURCE DIRECTION RESOLVING ANTENNAS

(76) Inventors: Nader Behdad, Madison, WI (US); Mudar Ala Al-Joumayly, Madison, WI (US)

( * ) Notice: Subject to any disclaimer, the term of this patent is extended or adjusted under 35 U.S.C. 154(b) by 238 days.

(21) Appl. No.: 12/949,276

(22) Filed: Nov. 18, 2010

(65) Prior Publication Data
US 2012/0127035 A1    May 24, 2012

(51) Int. Cl.
*G01S 5/04* (2006.01)
(52) U.S. Cl. ...................................................... 342/442
(58) Field of Classification Search .................. 342/434, 342/442, 445, 448
See application file for complete search history.

(56) References Cited

U.S. PATENT DOCUMENTS

| | | | | |
|---|---|---|---|---|
| 5,963,173 | A | * | 10/1999 | Lian et al. ...................... 343/742 |
| 8,134,516 | B1 | * | 3/2012 | Yaghjian et al. .............. 343/834 |
| 2012/0080957 | A1 | * | 4/2012 | Cooper et al. ................. 307/104 |

OTHER PUBLICATIONS

Yoo et al., Biometic Direction Sensitive Micromachined Diaphragm for Ultrasonic Transducers, 2001 IEEE Ultrasonics Symposium, vol. 2, pp. 887-890, 2001.
Cui et al., Optical Sensing in a Directional MEMS Microphone Inspired by the Ears of the Parasitoid fly Ormian Ochracea, In Proc. of the 19th International Conference on Micro Electro Mechanical Systems, pp. 614-617, Istanbul, Turkey, 2006.
Miles et al., The Development of a Biologically-Inspired Directional Microphone for Hearing Aids, Audiology and Neurotology, vol. 11, pp. 86-94, 2006.
Miles et al., A Low Noise Differential Microphone Inspired by the Ears of the Parasitoid Fly Ormia Ochracea, J. Acoustic. Soc. An., vol. 125, pp. 2013-2026, 2009.
Xin et al., An Improved Two-Antenna Direction of Arrival (DOA) Technique Inspired by Human Ears, Proc. IEEE AP-S Intl Symp., vol. 1, pp. 1-4, San Diego, CA, Jul. 5-11, 2008.
Michelsen, Hearing and Sound Communication in Small Animals: Evolutionary Adaptations to the Laws of Physics, The Evolutionary Biology of Hearing, 1992, pp. 61-77, Springer, New York.
Behdad et al., Super-Resolving Biomimetic Electrically Small Antennas and Their Applications, Accepted to the 2010 Antenna Applications Symposium, Robert Allerton Park, Monticello, IL, Sep. 21-23, 2010.
Behdad et al., Biomimetic Electrically Small Antennas, 2010 IEEE International Conference on Wireless Information Technology and Systems, Honolulu, Hawaii, USA, Aug. 28-Sep. 3, 2010.
Miles et al., Mechanically Coupled Ears for Directional Hearing in the Parasitoid Fly Ormia Ochracea, J. Acoust. Soc. Am., vol. 98, pp. 3059-3070, Dec. 1995.

(Continued)

*Primary Examiner* — Dao Phan
(74) *Attorney, Agent, or Firm* — Bell & Manning, LLC

(57) ABSTRACT

An electrically small receiver system is provided. The receiver system includes a plurality of antennas and a signal processing circuit. The plurality of antennas includes a first antenna configured to receive a first signal and a second antenna configured to receive a second signal. The signal processing circuit includes a first resonant loop and a second resonant loop. The first resonant loop is mounted to receive the first signal from the first antenna. The second resonant loop is mounted to receive the second signal from the second antenna. The first resonant loop and the second resonant loop are coupled such that the first output signal and the second output signal are generated as a function of the first signal and the second signal. A phase difference between the first output signal and the second output signal is greater than a phase difference between the first signal and the second signal.

20 Claims, 13 Drawing Sheets

OTHER PUBLICATIONS

Robert et al., Directional Hearing by Mechanical Coupling in the Parasitoid Fly Ormia Ochracea, J Comp. Physiol. A, vol. 179, pp. 29-44, Jul. 1996.

Akcakaya et al., Biologically inspired coupled antenna beampattern design, Bioinspiration & Biomimetics, vol. 5, No. 4, Nov. 10, 2010.

* cited by examiner

ELECTRICALLY SMALL, SOURCE DIRECTION RESOLVING ANTENNAS

BACKGROUND

Electrically small antennas have been the subject of many studies over the past few decades. An "electrically-small" antenna refers to an antenna or antenna element with relatively small geometrical dimensions compared to the wavelength of the electromagnetic fields the antenna radiates. In particular, a number of theoretical studies have examined the relationship between the electrical dimensions (physical dimensions normalized to the wavelength) of an antenna and its radiation characteristics including gain, radiation efficiency, bandwidth, and directional characteristics. These studies point to a set of either fundamental or practical limitations that govern the performance of such antennas. In particular, as the electrical dimensions of an antenna are decreased, the radiation efficiency and bandwidth also decrease. As a result, these studies propose a set of fundamental limits that predict the upper bounds of these radiation parameters. Similar theoretical studies have been carried out to investigate the relationship between the directionality of an antenna array or continuous aperture and its electrical size. The results show that, in theory, achieving super-directivity is possible from an antenna array or a continuous aperture. In principle, such super-directive arrays can be used to precisely resolve the direction of arrival of an electromagnetic (EM) wave. However, when the overall electrical dimensions of the antenna array decrease, the nearby elements of the array must be excited with significantly oscillatory and widely varying excitation coefficients to achieve super-directional characteristics. Thus, though mathematically possible, the realization of such excitation coefficients is not practical for small antenna arrays due to problems such as mutual coupling between the elements and the tolerances required in device fabrication.

SUMMARY

In an illustrative embodiment, an electrically small receiver system is provided. The receiver system includes a plurality of antennas and a signal processing circuit. The plurality of antennas includes a first antenna configured to receive a first signal and a second antenna configured to receive a second signal. The signal processing circuit includes a first resonant loop and a second resonant loop. The first resonant loop is mounted to receive the first signal from the first antenna. The second resonant loop is mounted to receive the second signal from the second antenna. The first resonant loop and the second resonant loop are coupled such that the first output signal and the second output signal are generated as a function of the first signal and the second signal. A phase difference between the first output signal and the second output signal is greater than a phase difference between the first signal and the second signal.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

An analogy can be drawn between the problem of super-resolving electrically small antennas and the sense of directional hearing in insects and small vertebrates. Many animals use sound waves for communication and sensing. The auditory system of such animals have evolved and adapted to be able to detect sound waves of interest and to localize their source. To achieve this, most animals use two ears, which act as pressure sensitive receivers excited by the pressure of an incoming sound wave. Based on the direction of incidence, the sound wave arrives at one ear earlier than the other. Additionally, the amplitude of the vibrations at the two ears is generally different due to the scattering caused by the animal's body. These differences in the time of arrival and the amplitude of the two received signals are the main cues used by the auditory system of most animals to determine the location of the emitting source.

In large animals and humans, the separation between the two ears is physically large and significant scattering of sound is created by the large head separating the two ears. This results in the large interaural time and intensity differences between the two received signals that can be easily detected by the animal's central nervous system. As the size of the animal decreases, however, these differences become smaller and smaller. Therefore, one would think that smaller animals and especially insects are inherently at a disadvantage when it comes to directional hearing. However, some small animals and insects demonstrate hyperacute directional hearing capabilities.

In these small animals/insects, the auditory organ is composed of two ears separated by a very small distance compared to the wavelength of sound. Due to this small separation and the small size of the animal's head, there is little or no intensity difference between the level of sound that arrives at the two ears. Therefore, the only cues available are the small differences in the time of arrival of the sound between the two ears. The auditory systems of these animals amplify the minute differences in the time of arrival of sound and increase them to detectable levels to determine a direction of the sound source. Thus, the auditory system of these small animals/insects measures a pressure difference at each ear. For example, in the parasitoid fly *Ormia Ochracea*, the separation between the two ears is so small that the ears are physically connected together using a flexible mechanical lever. This coupled ear mechanism enhances the minute difference in the time of arrival of the sound wave between the two ears and amplifies it to a level that is detectable by the fly's simple nervous system.

Figure 1:
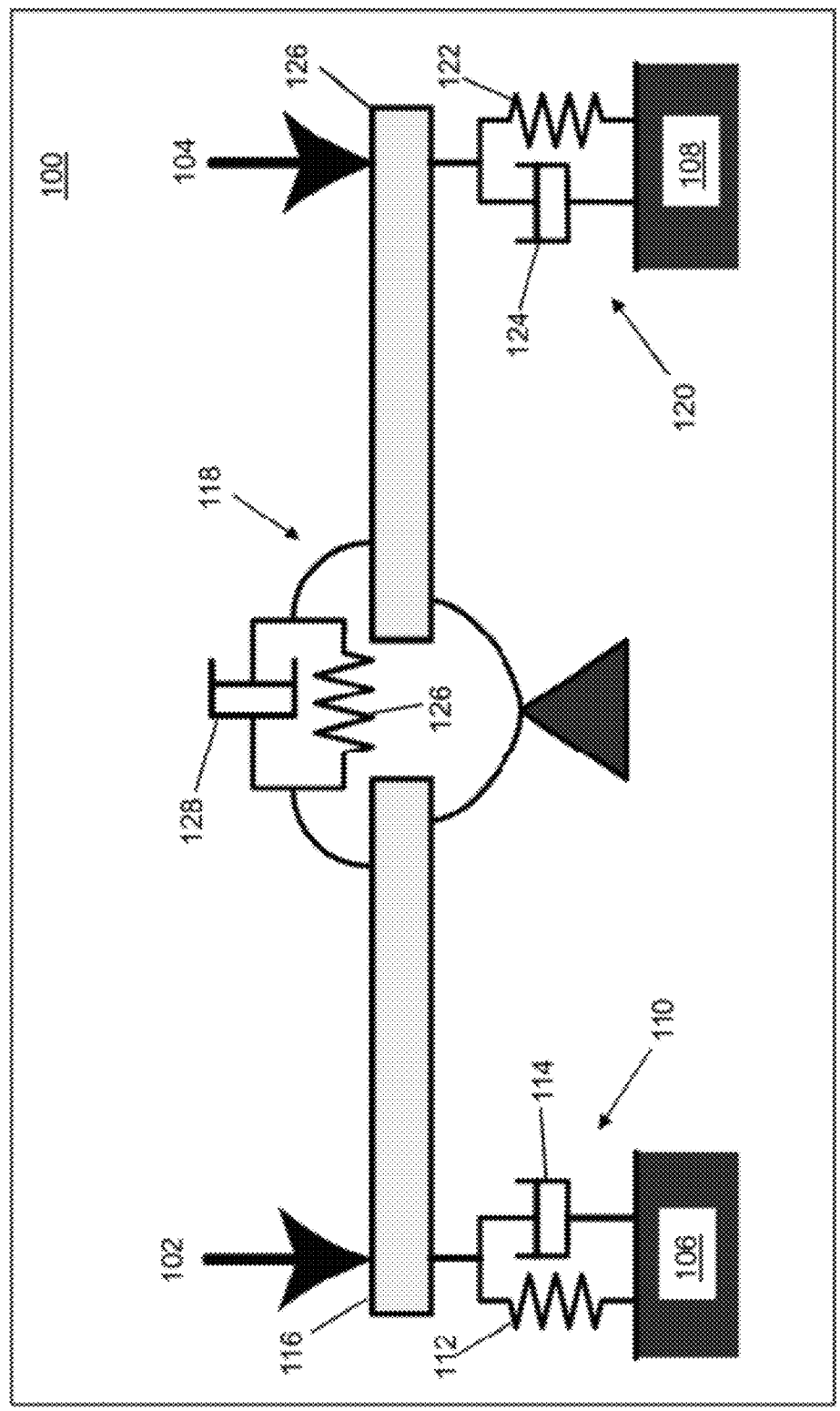
FIG. 1 depicts a block diagram of a mechanical system modeling a small insect auditory system in accordance with an illustrative embodiment.

With reference to FIG. 1, a mechanical model 100 of the fly's ear is shown in accordance with an illustrative embodiment, which has been shown to be capable of predicting the measured frequency response of the fly's ear with a reasonable degree of accuracy. Mechanical model 100 includes a second-order coupled resonator mechanical system with a first input 102, $f_1(\omega)$, and a second input 104, $f_2(\omega)$, which represent the forces exerted on each tympanal membrane by the sound wave, and a first output 106, $y_1(\omega)$, and a second output 108, $y_2(\omega)$, which represent the vibration amplitudes of each tympanal membrane. A first ear 110 is modeled as a first spring 112 and first damper 114 mounted in parallel from a first end 116 of a lever 118. Lever 118 connects first ear 110 with a second ear 120. Second ear 120 is modeled as a second spring 122 and second damper 124 mounted in parallel from a second end 126 of lever 118. A third spring 126 and a third damper 128 mounted in parallel across lever 118 couple first input 102 and second input 104 to generate first output 106 and second output 108.

Figure 2:
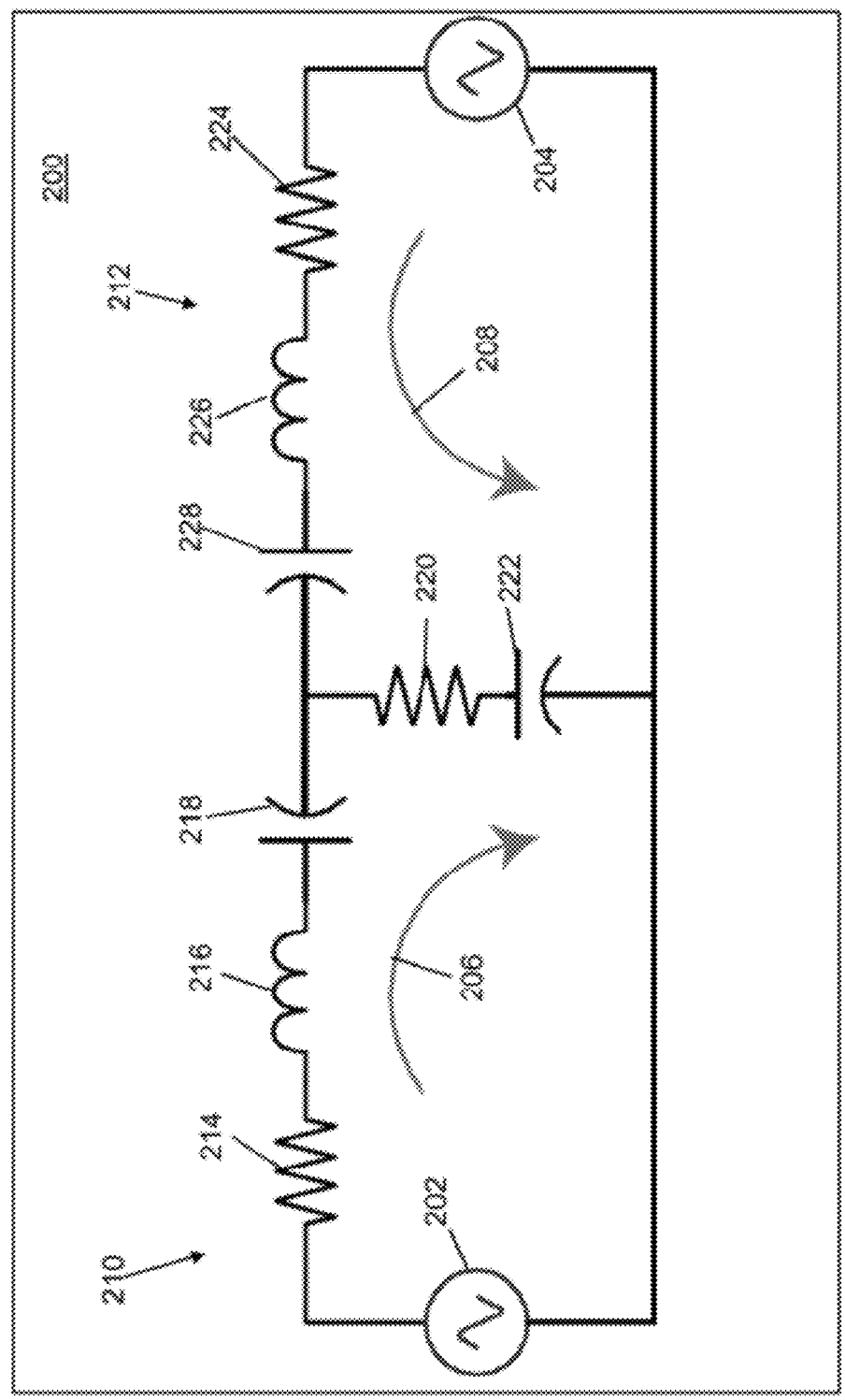
FIG. 2 depicts a first electrical circuit equivalent of the mechanical system of FIG. 1 in accordance with a first illustrative embodiment.

Using the equivalency between the basic mechanical elements (mass, damper, and spring) and electrical circuit elements (inductor, resistor, and capacitor), an electrical circuit 200 of mechanical model 100 can be derived from mechanical model 100 as shown with reference to FIG. 2. Electrical circuit 200 is obtained when considering force in a mechanical system to be analogous to voltage in an electric circuit and velocity in a mechanical system to be analogous to current. Electrical circuit 200 is a second-order coupled resonator network with a first input signal 202, $v_1(\omega)$, a second input signal 204, $v_2(\omega)$, a first output signal 206, $i_1(\omega)$, and a second output signal 208, $i_2(\omega)$. First input signal 202, $v_1(\omega)$ and second input signal 204, $v_2(\omega)$, are the input voltages, and first output signal 206, $i_1(\omega)$ and second output signal 208, $i_2(\omega)$, are the currents in each resonate loop. Because the two input signals 202, 204 of electrical circuit 200 represent the input signals at each ear, under sinusoidal excitation, the two input signals 202, 204 have the same magnitude and only a small phase difference between them caused by the difference in time of arrival of sound between the two ears. This phase difference can be expressed as $\emptyset_{in}(\theta)=2\pi d \sin\theta/\lambda_{s0}$, where $d<<\lambda_{s0}$, d is the spacing between the two ears, $\theta$ is the incidence angle, and $\lambda_{s0}$ is a free space sound wavelength.

Electrical circuit 200 may include a first resonant loop 210 and a second resonant loop 212. First resonant loop 210 may include a first resistor 214, a first inductor 216, a first capacitor 218, a second resistor 220, and a second capacitor 222. Second resonant loop 212 may include a third resistor 224, a second inductor 226, a third capacitor 228, second resistor 220, and second capacitor 222. First resistor 214, first inductor 216, and first capacitor 218 are mounted in series. Third resistor 224, second inductor 226, and third capacitor 228 are mounted in series. Second resistor 220 and second capacitor 222 are mounted in series to each other and parallel between first capacitor 218 and third capacitor 228 and couple first input signal 202 and second input signal 204 to generate first output signal 206 and second output signal 208. Thus, electrical circuit 200 includes coupled, series RLC resonant circuits.

By properly choosing the values of the circuit elements, electrical circuit 200 can be designed to increase the phase difference between the two output signals 206, 208, even though the two input signals 202, 204 are almost identical. Assuming that the two inputs are represented as $v_1=1$ and $v_2=e^{-j\emptyset_{in}(\theta)}$, the outputs can be represented as $i_1=A(\theta)e^{j\emptyset_1(\theta)}$ and $i_2=B(\theta)e^{j\emptyset_2(\theta)}$, where $\emptyset_{in}(\theta)$ represent the input phase, $A(\theta)$ and $B(\theta)$ represent the output amplitudes, and $\emptyset_1(\theta)$ and $\emptyset_2(\theta)$ represent the output phases. The output phase difference can be defined as $\emptyset_{out}(\theta)=\emptyset_1(\theta)-\emptyset_2(\theta)$.

Figure 3:
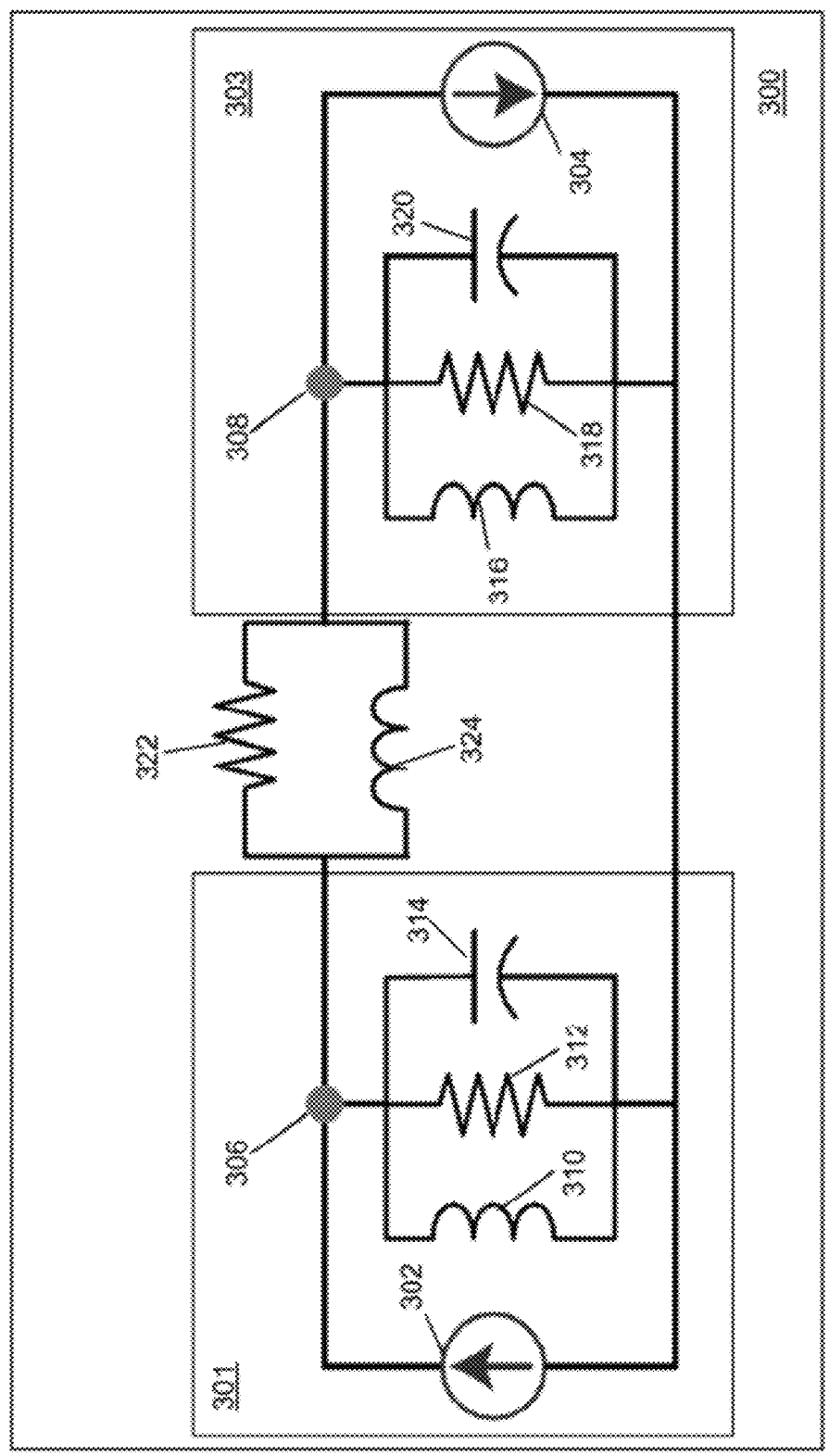
FIG. 3 depicts a second electrical circuit equivalent of the mechanical system of FIG. 1 in accordance with a second illustrative embodiment.

Using the equivalency between the basic mechanical elements (mass, damper, and spring) and electrical circuit elements (inductor, resistor, and capacitor), a second electrical circuit 300 of mechanical model 100 can be derived from mechanical model 100 as shown with reference to FIG. 3. Second electrical circuit 300 is obtained when considering force in a mechanical system to be analogous to current in an electric circuit and velocity in a mechanical system to be analogous to voltage. Second electrical circuit 300 is a coupled resonator network with a first input signal 302, $i_1(\omega)$, a second input signal 304, $i_2(\omega)$, a first output signal 306, $v_1(\omega)$, and a second output signal 308, $v_2(\omega)$. First input signal 302, $i_1(\omega)$, and second input signal 304, $i_2(\omega)$, represent the input current, and first output signal 306, $v_1(\omega)$, and a second output signal 308, $v_2(\omega)$ represent the output voltage across each parallel RLC circuit. Because the two input signals 302, 304 of second electrical circuit 300 represent the input signals at each ear, under sinusoidal excitation, the two input signals 302, 304 have the same magnitude and only a small phase difference between them caused by the difference in time of arrival of sound between the two ears. This phase difference again can be expressed as $\emptyset_{in}(\theta)=2\pi d \sin\theta/\lambda_{s0}$, where $d<<\lambda_{s0}$, d is the spacing between the two ears, $\theta$ is the incidence angle, and $\lambda_{s0}$ is a free space sound wavelength.

Second electrical circuit 300 may include a first RLC circuit 301, a second RLC circuit 303, a third resistor 322, and a third inductor 324. First RLC circuit 301 may include a first inductor 310, a first resistor 312, and a first capacitor 314. Second RLC circuit 303 may include a second inductor 316, a second resistor 318, and a second capacitor 320. First inductor 310, first resistor 312, and first capacitor 314 are mounted in parallel. Second inductor 316, second resistor 318, and second capacitor 320 are mounted in parallel. Second resistor 322 and second inductor 324 are mounted in parallel to each other and in series between first RLC circuit 301 and second RLC circuit 303 and couple first input signal 302 and second input signal 304 to generate first output signal 306 and second output signal 308. Thus, second electrical circuit 300 includes coupled, parallel RLC resonant circuits. Again, by properly choosing the values of the circuit elements, electrical circuit 300 can be designed to increase the phase difference between the two output signals 306, 308, even though the two input signals 302, 304 are almost identical.

Figure 4:
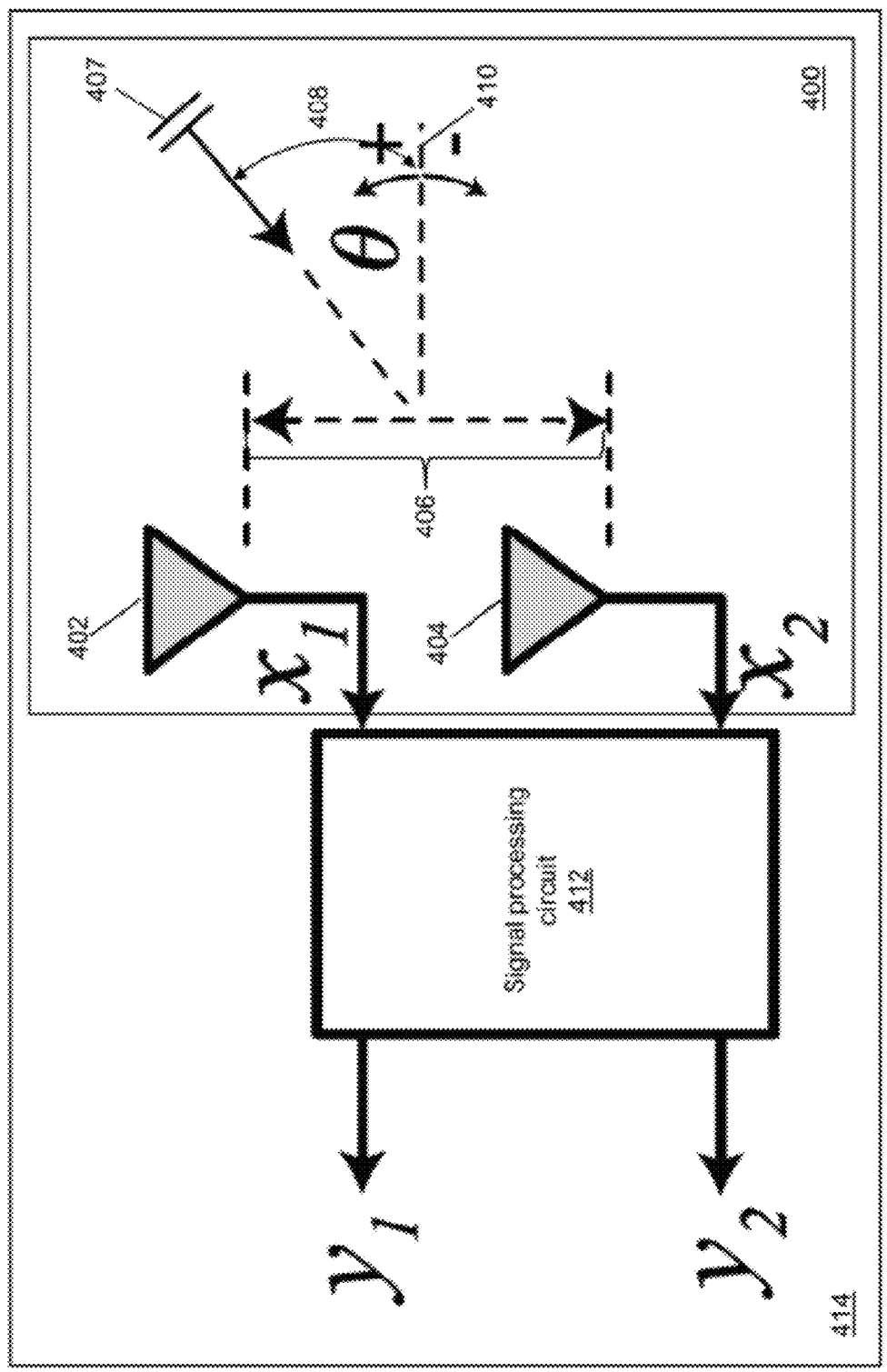
FIG. 4 depicts a block diagram of a receiver system utilizing the electrical circuit equivalent of FIG. 2 or FIG. 3 in accordance with a first illustrative embodiment.

With reference to FIG. 4, a block diagram of a receiver system 414 utilizing the electrical circuit equivalent of FIG. 2 or FIG. 3 in accordance with a first illustrative embodiment is depicted. Receiver system 414 includes an antenna array 400 shown in accordance with an illustrative embodiment and a signal processing circuit 412. Antenna array 400 may include a first antenna 402 and a second antenna 404 though a fewer or a greater number of antennas may be used. First antenna 402 and second antenna 404 are separated by a distance 406, d, where $d \ll \lambda_0$. $\lambda_0$ is the free space wavelength of an incident plane electromagnetic (EM) wave received from a source 407 positioned at an incidence angle 408, $\theta$, measured relative to a boresight direction 410 of antenna array 400. $\lambda_0 = c/f_0$, where c is the speed of light and $f_0$ is the carrier frequency of the incident plane electromagnetic (EM) wave. The antenna output signals $x_1$ and $x_2$ of antenna array 400 have the same magnitude and a phase difference of $\emptyset_{in}(\theta) = 2\pi d \sin\theta/\lambda_0$ and are input to signal processing circuit 412, which generates output signals $y_1$ and $y_2$, which have a significantly larger output phase difference which varies as a function of incidence angle. Even if distance 406, d, is not significantly smaller than the wavelength, $\lambda_0$, signal processing circuit 412 generates output signals $y_1$ and $y_2$ having a significantly larger output phase difference. For example, if $d \ll \lambda_0/2$, signal processing circuit 412 provides a better resolution than that which is achieved using a regular array architecture without signal processing circuit 412.

To quantify this, a dimensionless quantity denoted Sensitivity Factor (SF) can be defined for antenna array 400 without and with further processing using signal processing circuit 412:

$$SF_{without}(\theta) = \left|1 + \frac{x_1}{x_2}\right|^2 = |1 + e^{j\theta_{in}(\theta)}|^2 \quad (1)$$

$$SF_{with}(\theta) = \left|1 + \frac{y_1}{y_2}\right|^2 = |1 + A(\theta)/B(\theta)e^{-j\theta_{out}(\theta)}|^2 \quad (2)$$

where $SF_{without}$ refers to the sensitivity factor of antenna array 400 without further processing using signal processing circuit 412 and $SF_{with}(\theta)$ refers to the sensitivity factor of antenna array 400 with further processing using signal processing circuit 412. The angular variations of sensitivity factor are henceforth referred to as the sensitivity pattern. The sensitivity pattern is a dimensionless quantity, which can be used as a measure for quantifying the capability of a receiving array, composed of two closely spaced isotropic antennas, in determining the direction of arrival of an incoming EM wave. $SF_{with}(\theta)$ is the ratio of the power of the two output signals $y_1(\theta)$ and $y_2(\theta)$, i.e, $SF_{with}(\theta)|_{dB} = 10 \log(|y_1 + y_2|^2/|y_2|^2)$.

The sensitivity pattern is different from the traditional array factor, which is an indication of the amount of power received by an array. For antenna array 400 before processing using signal processing circuit 412, the sensitivity pattern and the normalized array factor have the same angular dependency. On the other hand, the angular variation of the sensitivity pattern after processing using signal processing circuit 412 is considerably different from those of its array factor. A comparison of equations (1) and (2) reveals that if $\emptyset_{out}(\theta)$ can be approximated as a linear function of $\emptyset_{in}(\theta)$ with a slope of m>1, the sensitivity pattern of antenna array 400 after processing using signal processing circuit 412 is equivalent to that of a regular two-element array with a spacing of m>d between the two elements. In other words, as far as spatial resolving capabilities of a receiving array are concerned, the effective aperture size of antenna array 400 after processing using signal processing circuit 412 is m times its maximum physical size, d. However, due to the nonlinear relationship between $\emptyset_{out}(\theta)$ and $\emptyset_{in}(\theta)$, this virtual aperture amplification is even more significant allowing antenna array 400 to have a sensitivity pattern equivalent to a multi-element array with significantly larger aperture dimensions and half-wavelength spacing between the elements. The outputs can be measured using receivers.

Figure 5:
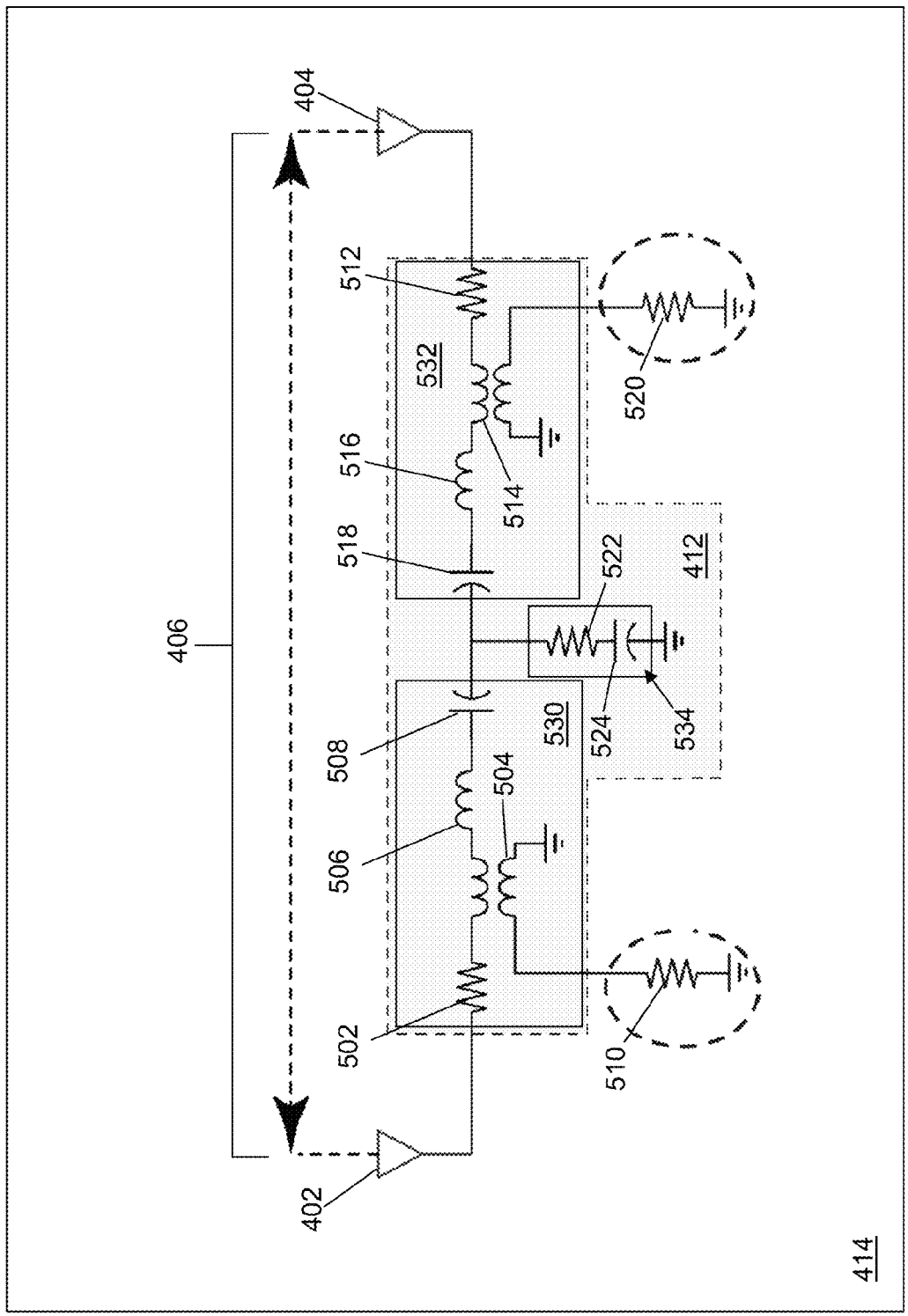
FIG. 5 depicts an electrical circuit of the receiver system of FIG. 4 in accordance with a first illustrative embodiment.

With reference to FIG. 5, a schematic of receiver system 414 including signal processing circuit 412 is shown in accordance with an illustrative embodiment. Signal processing circuit 412 may be based on electrical circuit 200 or second electrical circuit 300. In the illustrative embodiment of FIG. 5, signal processing circuit 412 is based on electrical circuit 200 and includes a first series circuit 530, a second series circuit 532, and a third series circuit 534. Third series circuit 534 is connected between first series circuit 530 and second series circuit 532. First series circuit 530 includes a first resistor 502, a first transformer 504, a first inductor 506, and a first capacitor 508 and receives a first signal $x_1$ from first antenna 402. Second series circuit 532 includes a second resistor 512, a second transformer 514, a second inductor 516, and a second capacitor 518 and receives a second signal $x_2$ from second antenna 404. Third series circuit 534 includes a third resistor 522 and a third capacitor 524 mounted in series to each other and parallel between first capacitor 508 and second capacitor 518. Third resistor 522 and third capacitor 524 couple first signal $x_1$ received from first antenna 402 and second signal $x_2$ received from second antenna 404 such that a first output signal $y_1$ and a second output signal $y_2$ are generated as a function of first signal $x_1$ and second signal $x_2$. First output signal $y_1$ is generated across a first output resistor 510, and second output signal $y_2$ is generated across a second output resistor 520. First transformer 504 and second transformer 514 simplify the sampling of the output loop currents, and first output resistor 510 and second output resistor 520 convert the sampled output loop currents to output voltages. If signal processing circuit 412 based on second electrical circuit 300 is used, first transformer 504 and second transformer 514 are not needed.

Figure 6:
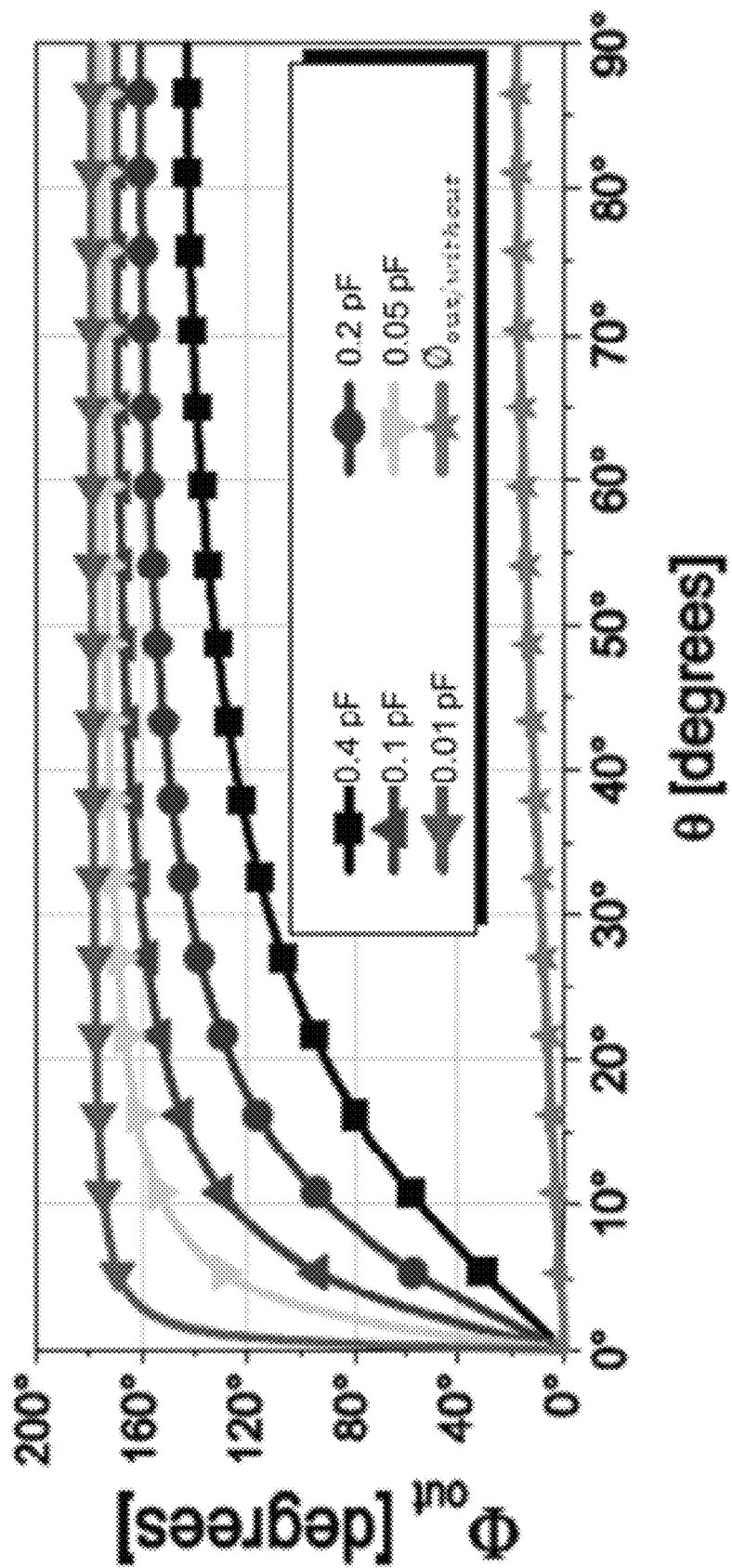
FIG. 6 depicts an output phase generated when not using the electrical circuit of FIG. 5 and generated using the electrical circuit of FIG. 5 as a function of incidence angle and for different values of coupling capacitance in accordance with the first illustrative embodiment.

With reference to FIG. 6, the phase difference as a function of incidence angle 408 was calculated for antenna array 400 including first antenna 402 and second antenna 404 comprised of two isotropic receiving elements spaced $0.05\lambda_0$ apart and with $A(\theta) = B(\theta)$. First resistor 502 and second resistor were defined as $1.1\Omega$. Third resistor 522 was defined as $0\Omega$. First capacitor 508 and second capacitor 518 were defined as 1.75 pF, and first inductor 506 and second inductor 516 were defined as 82 nanoHenry (nH). The values of third capacitor 524, also referenced as the coupling capacitor, were varied (0.4 pF, 0.2 pF, 0.1 pF, 0.05 pF, and 0.01 pF) to show the effect of this parameter on the output phase difference between the two output signals $y_1(\theta)$ and $y_2(\theta)$. Additionally, the phase difference between output signals $x_1$ and $x_2$ of antenna array 400 as a function of incidence angle 408 was calculated for comparison and is denoted $\emptyset_{out/without}$. Adjustment of third capacitor 524 results in a change in how rapidly the phase difference saturates to a level close to 180° as incidence angle 408 increases from boresight to 90°. Thus, third capacitor 524 may be a varactor that allows adjustment of a capacitance to change a response of the phase difference as a function of incidence angle 408 of source 407. As expected, the phase difference is significantly magnified using signal processing circuit 412. The phase difference output from signal processing circuit 412 shown in FIG. 6 has the form of an inverse tangent function, $\emptyset_{out}(\theta)=2\tan^{-1}(\theta/\theta_0)$, where $\theta_0$ is a constant defined based on the circuit parameters of signal processing circuit 412. For example, $\theta_0$ varies as a function of the value of third capacitor 524 such that as the value of third capacitor 524 becomes smaller the value of $\theta_0$ becomes smaller resulting in sharper phase variations as shown with reference to FIG. 6. In contrast, $\emptyset_{out/without}$ has the form of $\sin(\theta)$.

Figure 7:
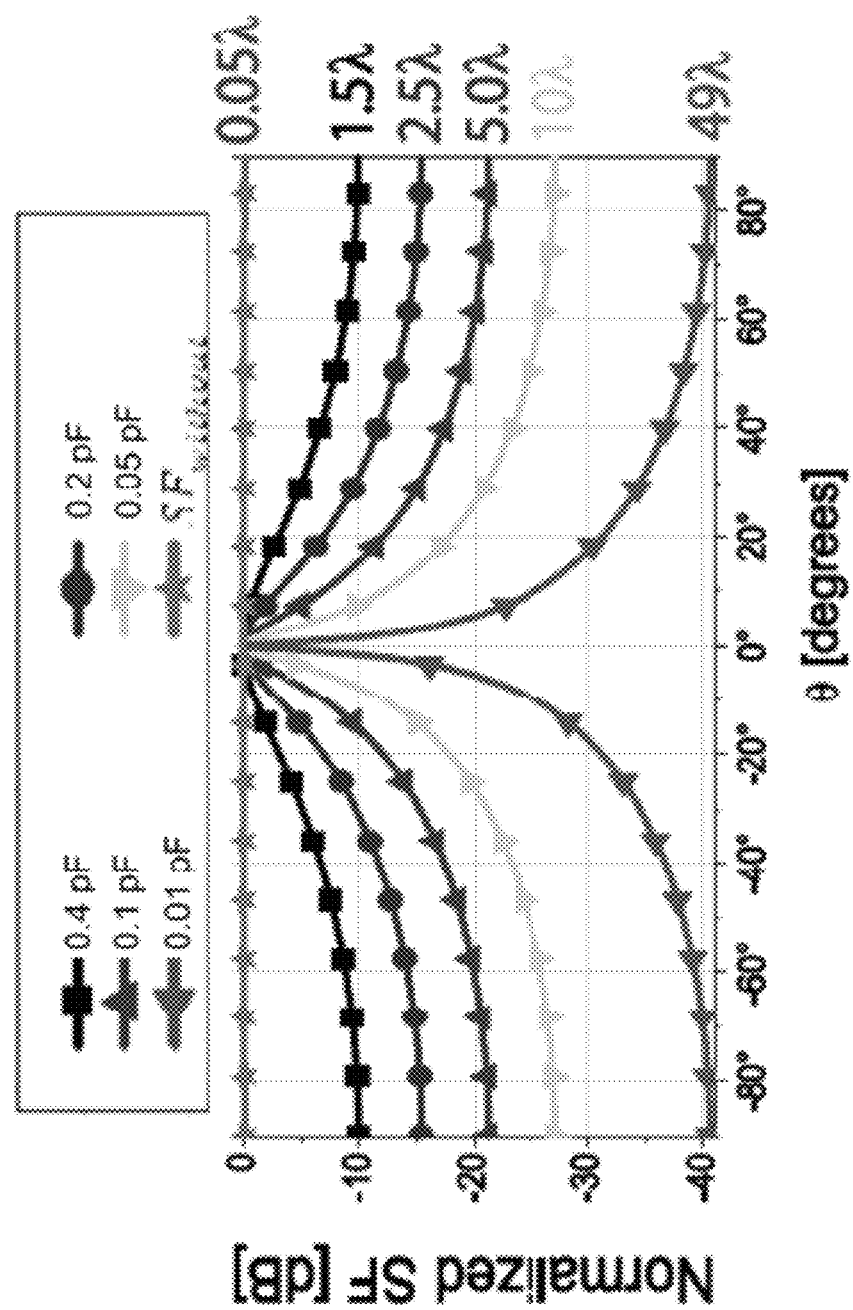
FIG. 7 depicts a normalized sensitivity factor generated when not using the electrical circuit of FIG. 5 and generated using the electrical circuit of FIG. 5 as a function of incidence angle and for different values of coupling capacitance in accordance with the first illustrative embodiment.

With reference to FIG. 7, a normalized sensitivity pattern as a function of incidence angle 408 was calculated for each case presented in FIG. 6 where $SF_{without}$ was calculated for comparison. As expected from equation (2), sharper variations of $\emptyset_{out}(\theta)$ as a function of incidence angle 408 result in sharper sensitivity patterns. Achieving the same sensitivity patterns and output phase profiles without using signal processing circuit 412 is only possible if a densely populated array with a significantly larger aperture size is used. The numbers next to the curves of FIG. 7 indicate the aperture size of an equivalent array, with more than two elements and $\lambda/2$ spacing between the elements that results in a similar sensitivity pattern 3 dB beamwidth.

A prototype of receiver system 414 was designed, fabricated, and tested at an operating frequency of 300 megahertz (MHz). First antenna 402 and second antenna 404 were composed of two electrically small monopole antennas separated by a distance of $0.05\lambda_0$ (5 centimeters (cm) at 300 MHz) and formed of short wire sections. In a plane normal to the axes of first antenna 402 and second antenna 404, the monopoles are omnidirectional antennas. First antenna 402 and second antenna 404 were located on top of a ground plane with finite dimensions. A thin dielectric substrate with dielectric constant of 3.4 and thickness of 500 microns (μm) covered the bottom side of the ground plane. The signal processing circuit 412 elements were mounted on the bottom side of the dielectric substrate and connected to each other and to first antenna 402 and second antenna 404 using simple 50 ohm (Ω) microstrip transmission lines. The connection between first antenna 402 and second antenna 404 and the transmission lines was accomplished using through hole vias. The outputs of first transformer 504 and second transformer 514 were connected to the output ports of the respective first antenna 402 and second antenna 404 using two identical 50Ω lines. Thus, first output resistor 510 and second output resistor 520 were 50Ω.

First resistor 502 and second resistor 512 represent the radiation resistances of first antenna 402 and second antenna 404, respectively, and were estimated as 1.1Ω. First capacitor 508 and second capacitor 518 represent the reactive part of the input impedances of first antenna 402 and second antenna 404, respectively, and were estimated as 1.75 pF. Third resistor 522 was 0Ω. Therefore, the only external circuit elements utilized were first inductor 506, second inductor 516, third capacitor 524, first transformer 504, and second transformer 514 that were used to convert the output loop currents into output port voltages that could be easily measured using a vector network analyzer. In the prototype, first inductor 506 and second inductor 516 were 82 nanoHenry (nH) and third capacitor 524 was 0.2 pF. first transformer 504 and second transformer 514 were small RF transformers manufactured Coilcraft Corporation.

Figure 8:
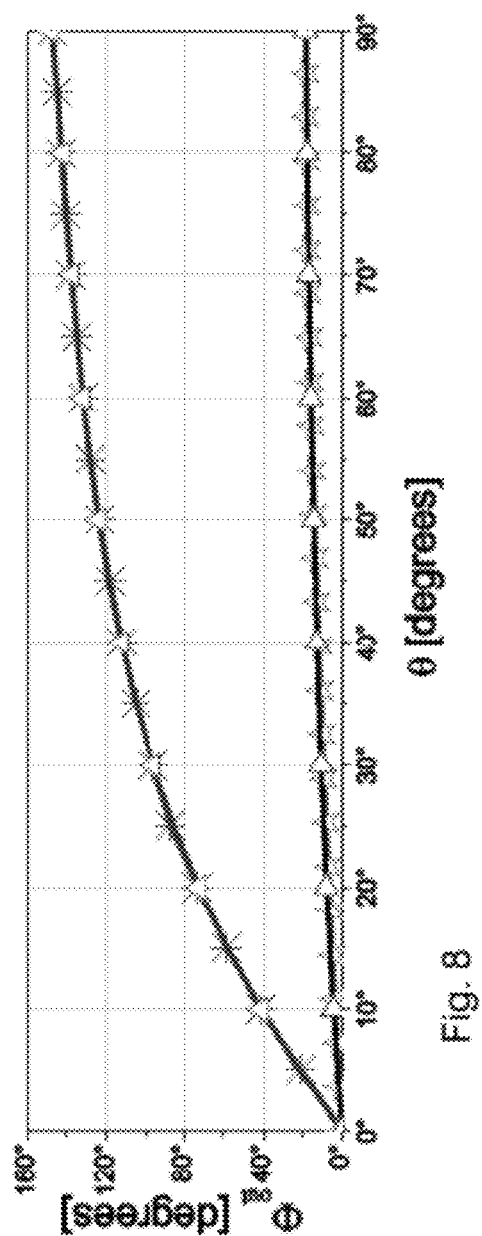
FIG. 8 depicts a measured and a simulated output phase generated when not using the electrical circuit of FIG. 5 and generated using the electrical circuit of FIG. 5 as a function of incidence angle in accordance with the first illustrative embodiment.

The fabricated prototype of receiver system 414 was illuminated by a plane wave from various incidence angles and the measured output was captured. With reference to FIG. 8, the phase difference between the two outputs of receiver system 414, "Measured output 412", and between the two outputs of antenna array 400, "Measured output w/out", are compared. Additionally, the measured results are compared to the theoretically predicted results, "Simulated output 412" and "Simulated output w/out", respectively.

First antenna 402 and second antenna 404 were simulated in CST Microwave Studio® sold by Computer Simulation Technology AG. First antenna 402 and second antenna 404 were simulated in the presence of each other to calculate their effective input impedance, while taking the mutual coupling into account. The data was used to obtain a Thevenin equivalent circuit model for each of first antenna 402 and second antenna 404 and to obtain the values of the lumped element components. The maximum phase difference between first antenna 402 and second antenna 404 at 300 MHz was approximately 18°, corresponding to an incidence angle of 90° from boresight.

Figure 9:
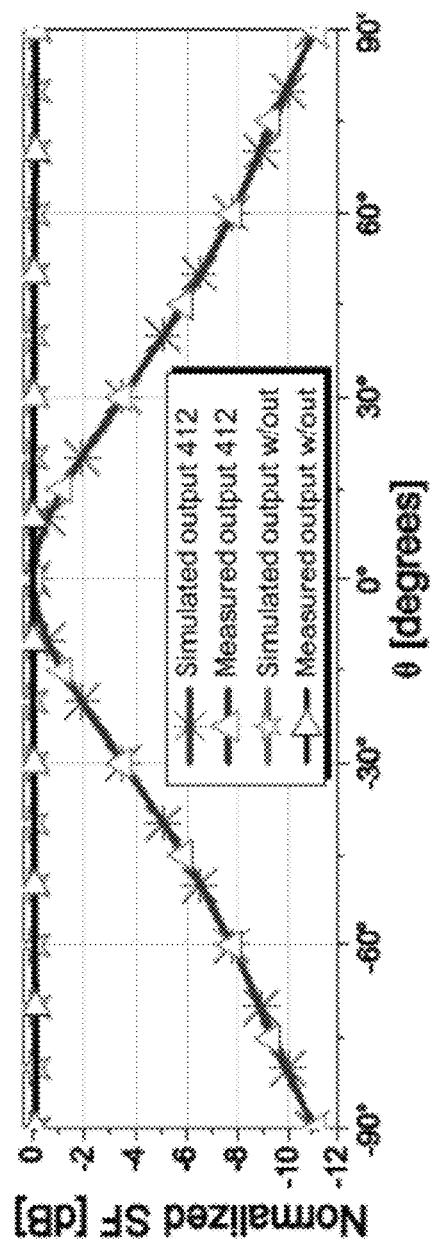
FIG. 9 depicts a measured and a simulated normalized sensitivity factor generated when not using the electrical circuit of FIG. 5 and generated using the electrical circuit of FIG. 5 as a function of incidence angle in accordance with the first illustrative embodiment.

The measured results agree very well with the theoretically predicted ones and confirm that the output phase difference is indeed enhanced after processing through signal processing circuit 412 as compared to the direct outputs of antenna array 400. Additionally, the measured and simulated sensitivity patterns are shown with reference to FIG. 9. As expected, despite the extremely small aperture dimensions of antenna array 400, the sensitivity pattern produced using signal processing circuit 412 was more directional compared to that produced by the direct outputs of antenna array 400.

Simulation and measurement results indicate that the reactive elements used in signal processing circuit 412 do not noticeably increase the noise temperature of antenna array 400. Thus, the signal to noise ratio is primarily determined by the available power of output signals $x_1$ and $x_2$ of antenna array 400. Thus, signal processing circuit 412 does not provide a higher gain. In other words, the maximum power that antenna array 400 can collect is still limited by the physical size of its aperture.

The absolute value of the sensitivity pattern is only a function of incidence angle 408 not its power density. Therefore, both the coherent measurement of $\emptyset_{out}(\theta)$ as well as the incoherent measurement of the sensitivity factor can be used as a means of detecting the direction of arrival of an EM wave.

In the most general case, three different outputs of signal processing circuit 412 can be measured. These include the loop currents, first output signal 208, $y_1=i_1(\omega)$, and second output signal 208, $y_2=i_2(\omega)$ and a third output signal $y_3=i_3(\omega)=y_1+y_2$, which is the branch current flowing in the parallel branch through third resistor 522 and third capacitor 524. Therefore, the angular dependency of $y_3$ as a function of $\theta$ is in the form of $y_3(\omega,\theta) \propto 1+e^{-j2\pi d \sin \theta/\lambda_0}$, which is the conventional definition of array factor and the same as the sensitivity pattern of the regular array. Therefore, the angular variation of the signal $y_3=i_3(\omega)=y_1+y_2$ follows the angular variation of the array without processing through signal processing circuit 412. Thus, the electrically small aperture dimension with three different outputs allows antenna array 400 to act as an omnidirectional receiving antenna with the capability of resolving the direction of arrival of an incoming EM wave using either a coherent system or an incoherent system.

Figure 10:
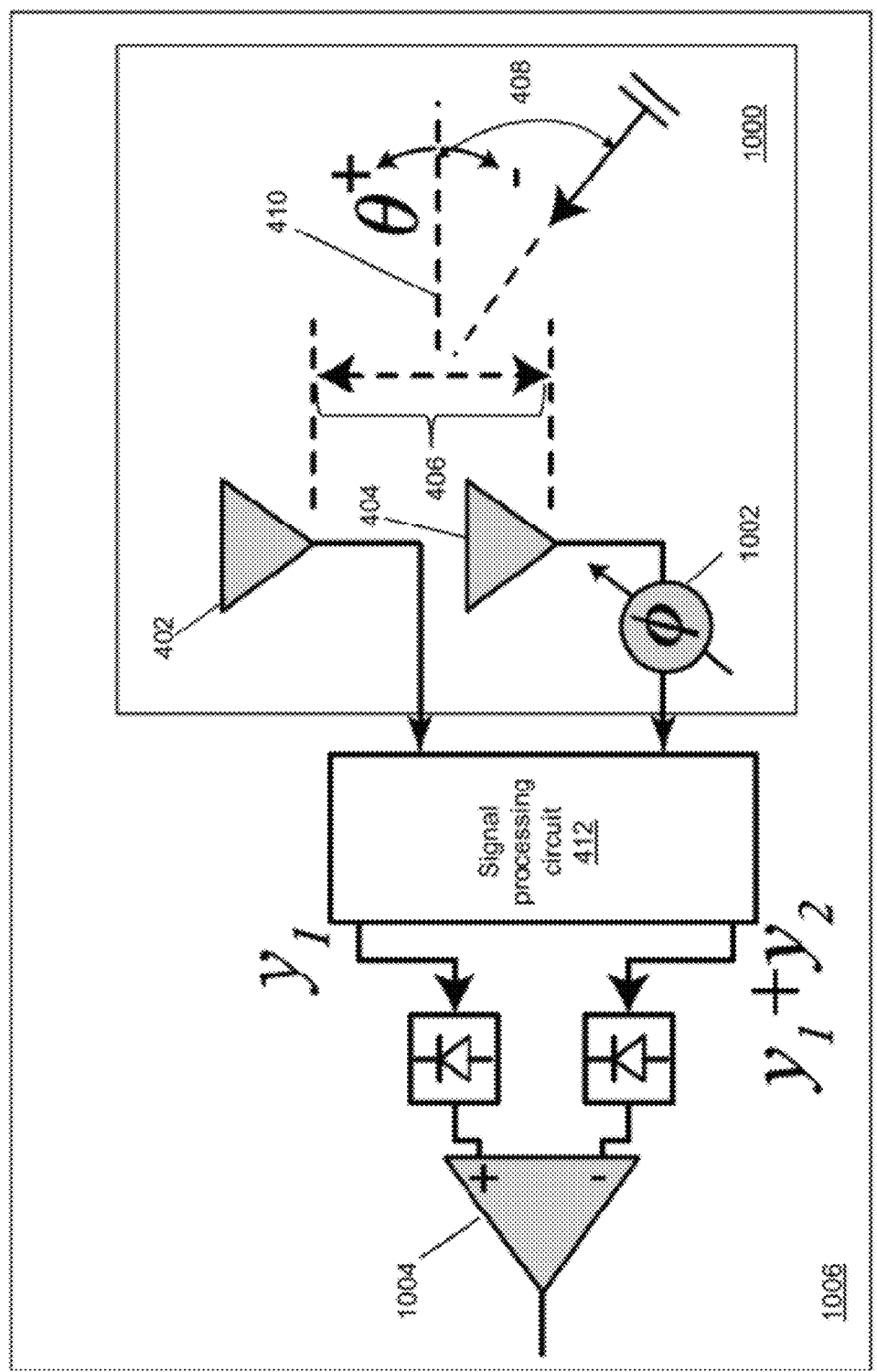
FIG. 10 depicts a block diagram of a second receiver system utilizing the electrical circuit equivalent of FIG. 2 or FIG. 3 in accordance with a second illustrative embodiment.

In a general direction finding system, the direction of arrival of a signal is detected from any given direction. However, the phase response of receiver system 414 is most sensitive to phase variations within its 3 dB beamwidth range as illustrated in FIG. 7. To overcome this problem, antenna array 400 can be electronically scanned. With reference to FIG. 10, a block diagram of a second receiver system 1006 utilizing the electrical circuit equivalent of FIG. 2 or FIG. 3 in accordance with a second illustrative embodiment is depicted. Second receiver system 1006 includes a steerable array 1000 shown in accordance with an illustrative embodiment and signal processing circuit 412.

Steerable array 1000 may include first antenna 402 and second antenna 404 though a greater number of antennas may be used. A phase shifter 1002 is integrated with second antenna 404 to steer the sensitivity beam. Phase shifters providing different amounts of phase shift may be integrated with additional antennas to create additional steerable sensitivity beams. In an illustrative embodiment, phase shifter 1002 is implemented using a transmission line loaded with a single varactor. The output signals of steerable array 1000 are input to signal processing circuit 412. The output signals $y_1$ and $y_1+y_2$ of processing circuitry 412 are amplitude detected and applied to a comparator 1004.

Figure 11:
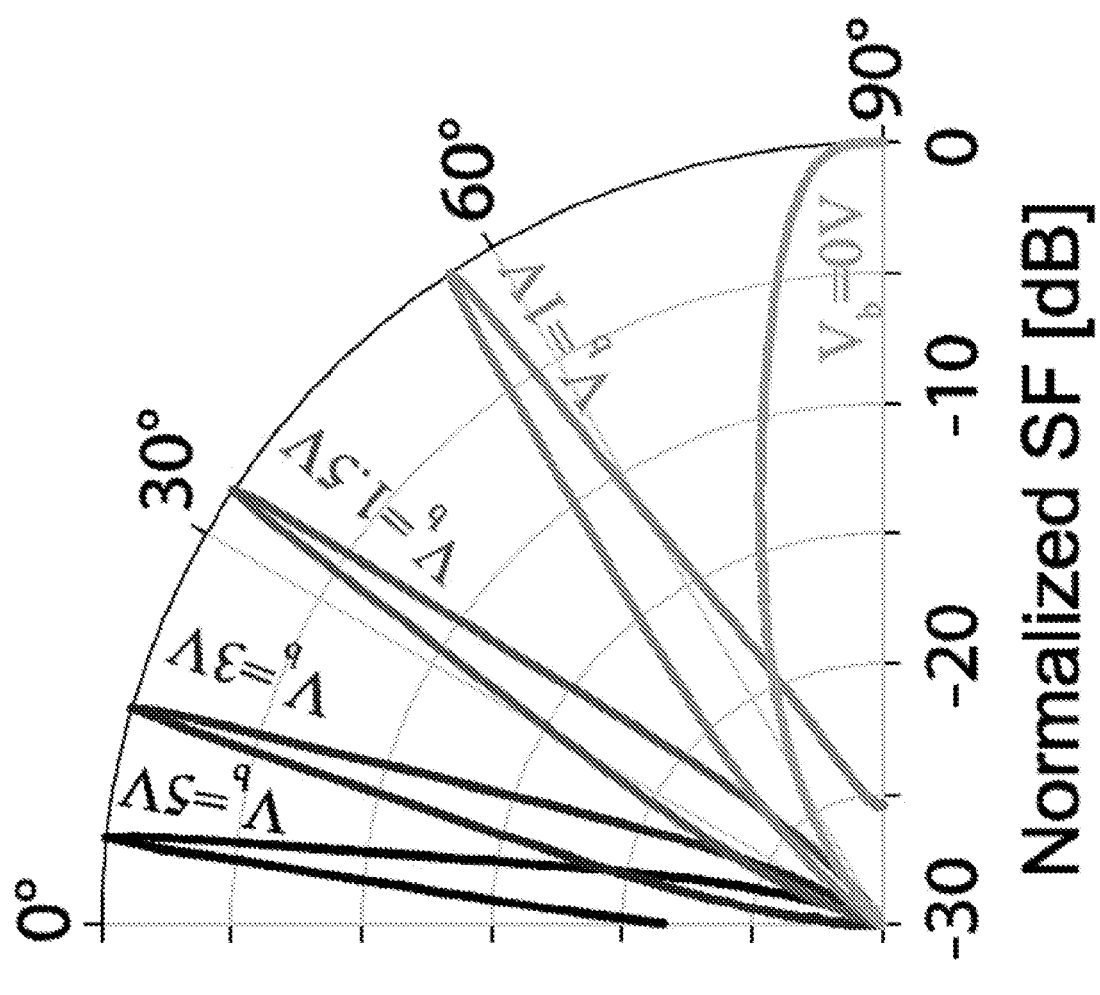
FIG. 11 depicts sensitivity beams based on the second receiver system of FIG. 10 in accordance with the second illustrative embodiment.

By electronically varying signal processing circuit 412 (e.g. value of third capacitor 524 as shown in FIGS. 6 and 7), the 3 dB beamwidth of the sensitivity pattern can also be dynamically changed. Due to the phase amplifying characteristics of signal processing circuit 412, for small d values, phase shifter 1002 only needs to provide a moderate phase shift to scan the sensitivity pattern from $\theta=90°$ to $-90°$. For example, for $d=0.05\lambda_0$, a phase shift of only $\pm 18°$ may be used. With reference to FIG. 11, the sensitivity patterns using signal processing circuit 412 and phase shifter 1002, for various values of the varactor's bias voltage, $V_b$, are shown.

The sensitivity pattern can be directly measured by two simple power measurements $SF_{with}(\theta)=|y_1(\theta)+y_2(\theta)|^2/|y_2(\theta)|^2=|y_3(\theta)|^2/|y_2(\theta)|^2$. Therefore, measuring the sensitivity factor and comparing its value to the a priori known maximum value of the function can be used as a means of determining if a signal is arriving from the direction of maximum sensitivity. For example, output signals $y_1$ and $y_1+y_2$ of processing circuitry 412 with simple power detectors and comparator 1004 can be used to determine if a signal is arriving from the vicinity of $\theta=0°$. In this system, by rapidly scanning the beam and monitoring the output of comparator 1004, the direction of an incoming signal can be determined using only power measurements. $y_3$ may be measured directly or calculated by summing $y_1+y_2$.

Figure 12:
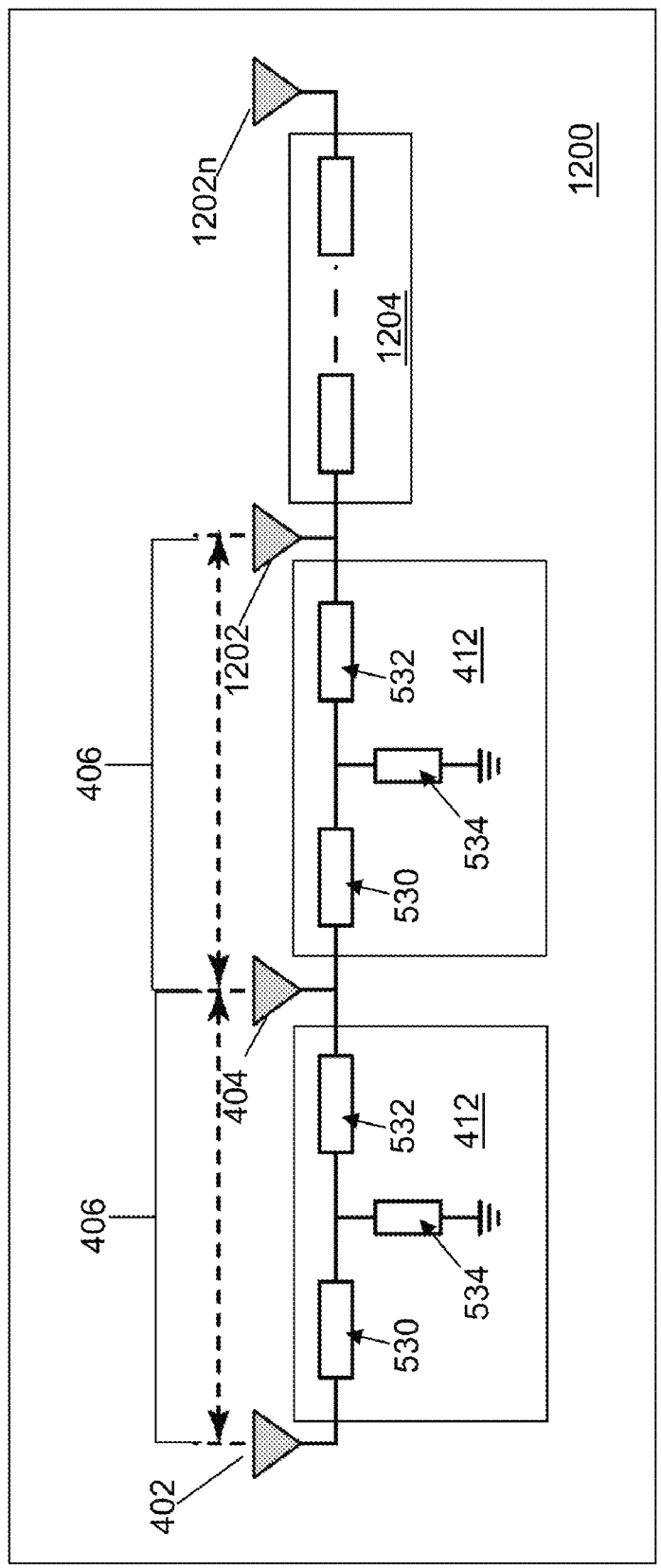
FIG. 12 depicts a block diagram of a third receiver system utilizing the electrical circuit equivalent of FIG. 2 or FIG. 3 in accordance with a third illustrative embodiment.

Antenna array 400 can be expanded to include more than two antennas as shown with reference to FIG. 12 which shows a third receiver system 1200 which includes an antenna array with up to n antennas. Third receiver system 1200 may include first antenna 402, second antenna 404, a third antenna 1202, and up to an $n^{th}$ antenna 1202n. As understood by a person of skill in the art, repetition circuitry 1204 indicates a repetition of signal processing circuit 412 between successive antennas up to $n^{th}$ antenna 1202n. Antenna array 400 can be treated as the unit cell of a periodic structure that is repeated along one-dimension as shown in FIG. 12. In this version based on signal processing circuit 412, the voltages at the input terminals of first antenna 402, second antenna 404, third antenna 1202, and $n^{th}$ antenna 1202n are the inputs, and the loop currents $i_1, i_2, \ldots i_{2n-2}$ are the outputs of the system.

Assuming the array elements are uniformly spaced with the spacing of distance 406, d, and third receiver system 1200 is illuminated with a plane wave, a small progressive input phase shift of $\emptyset_{in}(\theta)=2\pi d \sin\theta/\lambda_0$ exists between each two consecutive receiving antennas. A similar progressive phase shift also exists between each two consecutive outputs (adjacent loop currents). However, similar to antenna array 400 using signal processing circuit 412, the output phase difference is considerably magnified compared to $\emptyset_{in}(\theta)$. In such a 1-D array, a separate sensitivity pattern can be defined for each set of outputs $(i_1, i_2), (i_2, i_3), \ldots, (i_{2n-3}, i_{2n-2})$ using equation (2). In this case, an array composed of n elements can have n−1 independently controlled sensitivity beams.

Receiver system 414, second receiver system 1006, and third receiver system 1200 are configured to resolve the direction of arrival of a signal in a single plane. However, the antenna arrays can be expanded to two-dimensional arrays composed of three or more elements placed along two different axes. For example, an electrically small three-element array with a star or a delta configuration can be used to detect the direction of arrival of a signal with a full hemispherical coverage.

Figure 13:
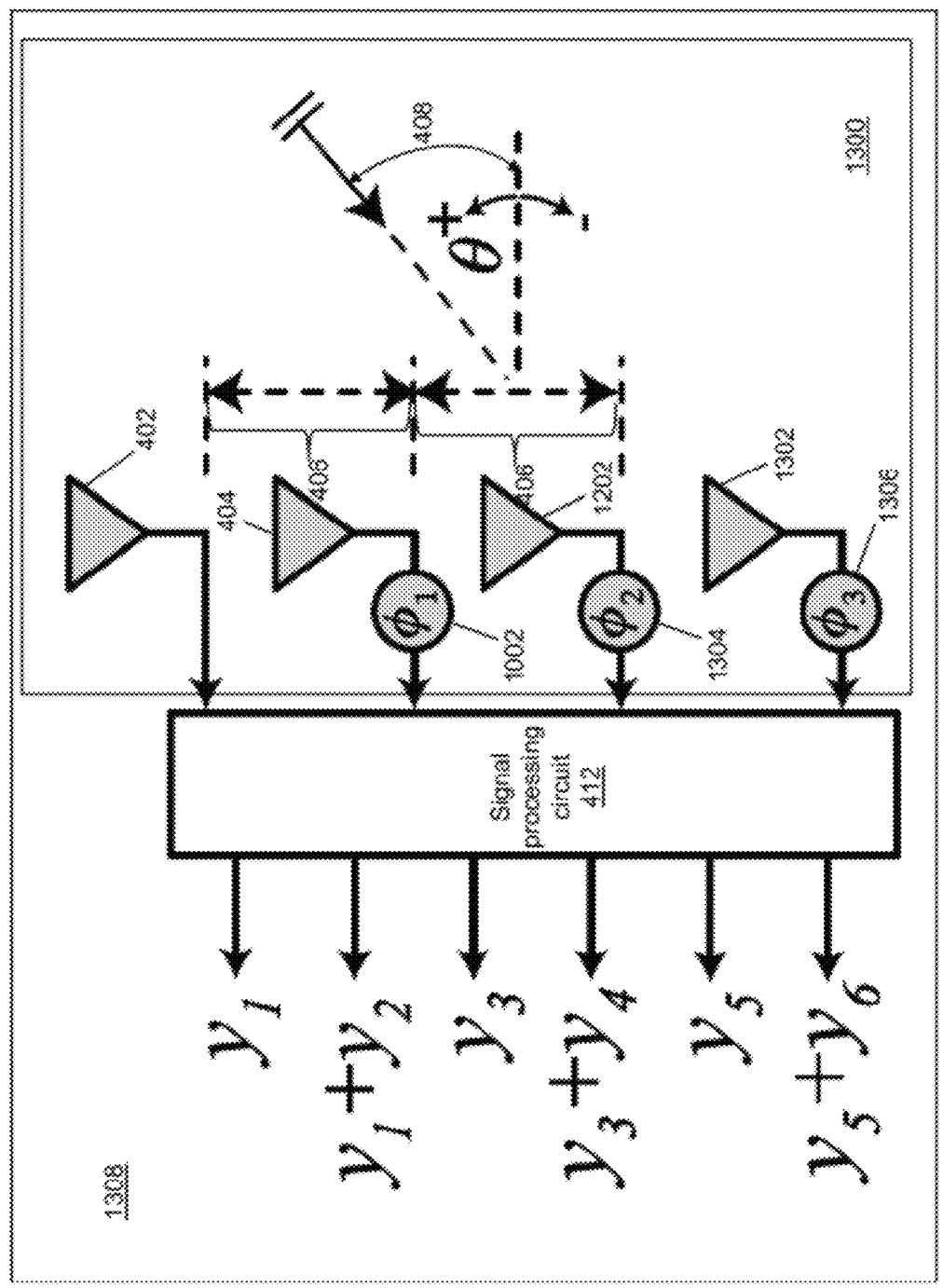
FIG. 13 depicts a block diagram of a fourth receiver system utilizing the electrical circuit equivalent of FIG. 2 or FIG. 3 in accordance with a fourth illustrative embodiment.

With reference to FIG. 13, a block diagram of a fourth receiver system 1308 utilizing the electrical circuit equivalent of FIG. 2 or FIG. 3 in accordance with a fourth illustrative embodiment is depicted. Fourth receiver system 1308 includes a multi-beam array 1300 shown in accordance with an illustrative embodiment and signal processing circuit 412. Multi-beam array 1300 may include first antenna 402, second antenna 404, third antenna 1202, and a fourth antenna 1302 though any number of antennas may be used. The sharpness and beam direction of each sensitivity pattern can be controlled independent of the other beams using signal processing circuit 412. Multi-beam array 1300 can be designed to compensate for the natural beam broadening observed in second receiver system 1006 as shown with reference to FIG. 11. Second antenna 404 is integrated with phase shifter 1002; third antenna 1202 is integrated with a second phase shifter 1304; and fourth antenna 1302 is integrated with a third phase shifter 1306. Phase shifter 1002, second phase shifter 1304, and third phase shifter 1306 may be implemented as transmission line based phase shifters. The values of phase shifter 1002, second phase shifter 1304, and third phase shifter 1306 determine the direction of maximum sensitivity of each sensitivity pattern. Though the design of signal processing circuit 412 is the same, the values of the circuit elements associated with receipt of signals from each antenna 402, 404, 1202, 1302 may be different from each other. For small element spacing, only moderate phase shift values are needed to achieve any desired beam direction in the $\theta=\pm 90°$ range.

Figure 14:
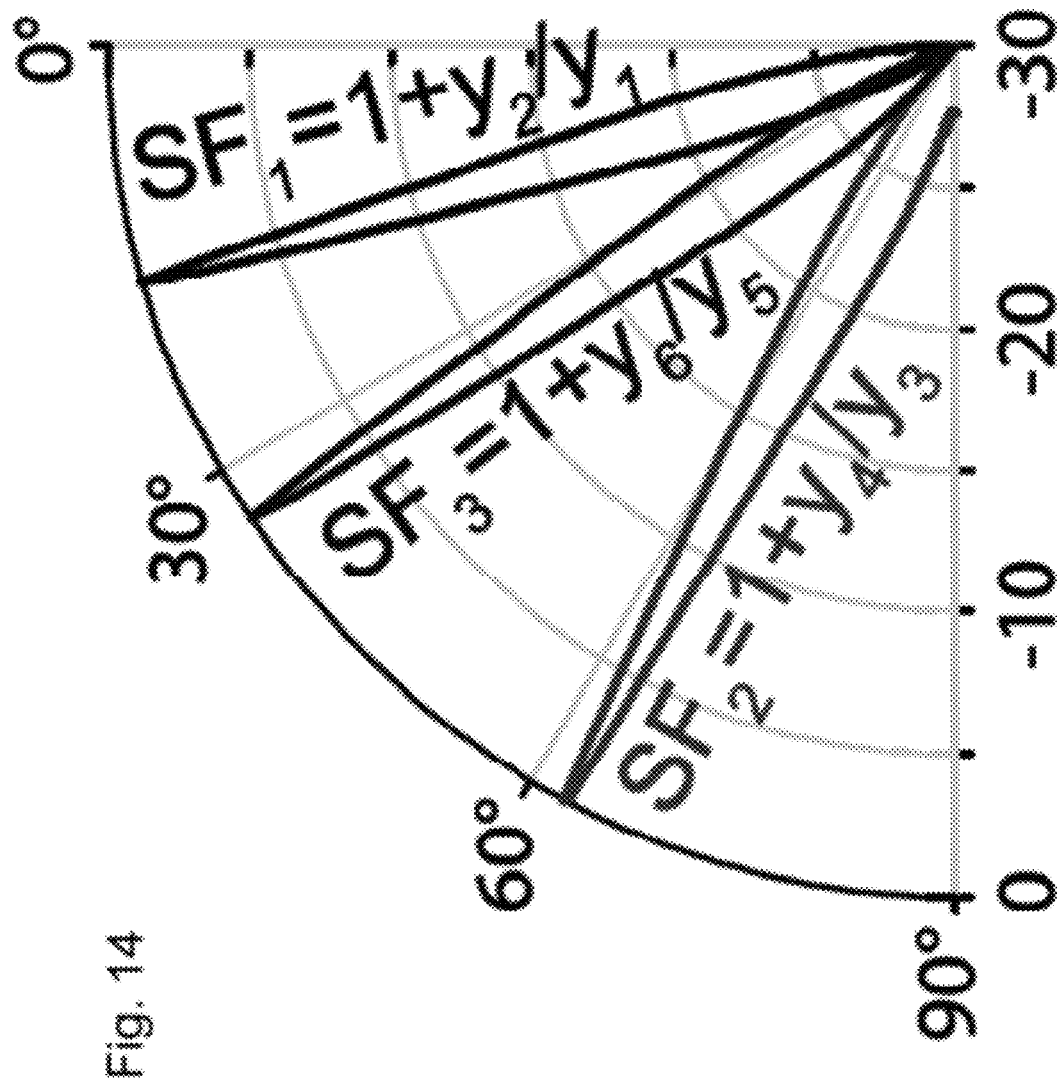
FIG. 14 depicts sensitivity beams based on the fourth receiver system of FIG. 13 in accordance with the fourth illustrative embodiment.

With reference to FIG. 14, the sensitivity patterns which result from use of fourth receiver system 1308 are shown. The beam broadening indicated with reference to FIG. 11 is not observed in FIG. 14 because the beamwidths of the sensitivity patterns of each beam are controlled independently through signal processing circuit 412.

Receiver system 414, second receiver system 1006, third receiver system 1200, and fourth receiver system 1308 may be used in a variety of sensing and imaging systems. For example, in choosing frequencies of operation for microwave breast imaging applications, a tradeoff is made between penetration depth and resolution. The penetration depth is better at lower frequencies, but the resolution is better at higher frequencies. The described embodiments using signal processing circuit 412 provide a method for enhancing the resolutions at low frequencies where the penetration depth is better. As another example, a small-aperture RF tracking sensor may be implemented based on fourth receiver system 1308 and an array of amplitude detectors and comparators, which produce a digital output indicating a region in which a source is located.

As used in this disclosure, the term "mount" includes join, unite, connect, associate, insert, hang, hold, affix, attach, fasten, bind, paste, secure, bolt, screw, rivet, solder, weld, glue, form over, layer, and other like terms. The phrases "mounted on" and "mounted to" include any interior or exterior portion of the support member referenced.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A receiver system comprising:
a plurality of antennas comprising
a first antenna configured to receive a first signal; and
a second antenna configured to receive a second signal; and
a signal processing circuit comprising
a first resonant loop mounted to receive the first signal from the first antenna; and
a second resonant loop mounted to receive the second signal from the second antenna, wherein the first resonant loop and the second resonant loop are coupled to generate a first output signal and a second output signal that are a function of the first signal and the second signal, and further wherein a first phase difference between the first output signal and the second output signal is greater than a second phase difference between the first signal and the second signal.

2. The receiver system of claim 1, wherein the first resonant loop and the second resonant loop are coupled by a capacitor mounted in parallel with the first resonant loop and the second resonant loop.

3. The receiver system of claim 2, wherein the capacitor is a varactor.

4. The receiver system of claim 3, wherein adjustment of a capacitance of the varactor changes a response of the first phase difference as a function of an angle of incidence of a source of the first signal relative to a boresight of the plurality of antennas.

5. The receiver system of claim 4, wherein the source of the first signal is the same as a second source of the second signal.

6. The receiver system of claim 2, wherein the capacitor generates a third output signal.

7. The receiver system of claim 1, wherein the first resonant loop comprises a first resistor, a first inductor, and a first capacitor connected in series.

8. The receiver system of claim 7, wherein the first resistor includes a radiation resistance of the first antenna.

9. The receiver system of claim 7, wherein the first resistor includes a resistance of a transmission line connecting the first antenna with the signal processing circuit.

10. The receiver system of claim 7, wherein the first capacitor is a reactive part of an input impedance of the first antenna.

11. The receiver system of claim 7, wherein the second resonant loop comprises a second resistor, a second inductor, and a second capacitor connected in series.

12. The receiver system of claim 11, wherein the first inductor and the second inductor have approximately the same value of inductance.

13. The receiver system of claim 1, wherein the first resonant loop comprises a resistor, an inductor, and a capacitor connected in parallel.

14. The receiver system of claim 1, further comprising a phase shifter electrically connected to receive the second signal from the second antenna to form a phase-shifted second signal, wherein the second resonant loop receives the phase-shifted second signal.

15. The receiver system of claim 14, wherein the first resonant loop and the second resonant loop are coupled by a capacitor mounted in parallel with the first resonant loop and the second resonant loop to generate a third output signal.

16. The receiver system of claim 15, wherein the plurality of antennas further comprise a third antenna configured to receive a third signal, and the signal processing circuit further comprises:
a third resonant loop mounted to receive the second signal from the second antenna and to generate a fourth output signal;
a fourth resonant loop mounted to receive the third signal from the third antenna and to generate a fifth output signal; and
a second capacitor mounted in parallel with the third resonant loop and the fourth resonant loop to generate a sixth output signal.

17. The receiver system of claim 16, further comprising:
a first amplitude detector configured to receive the first output signal;
a second amplitude detector configured to receive the third output signal;
a first comparator configured to receive the amplitude detected first output signal and the amplitude detected third output signal;
a third amplitude detector configured to receive the fourth output signal;
a fourth amplitude detector configured to receive the sixth output signal; and
a second comparator configured to receive the amplitude detected fourth output signal and the amplitude detected sixth output signal.

18. The receiver system of claim 15, further comprising:
a first amplitude detector configured to receive the first output signal;
a second amplitude detector configured to receive the third output signal; and
a comparator configured to receive the amplitude detected first output signal and the amplitude detected third output signal.

19. The receiver system of claim 1, wherein the plurality of antennas further comprise a third antenna configured to receive a third signal, and the signal processing circuit further comprises:
a third resonant loop mounted to receive the second signal from the second antenna and to generate a third output signal; and a fourth resonant loop mounted to receive the third signal from the third antenna and to generate a fourth output signal, wherein the third resonant loop and the fourth resonant loop are coupled, and further wherein a third phase difference between the third output signal and the fourth output signal is greater than a fourth phase difference between the second signal and the third signal.

20. The receiver system of claim 1, wherein a spacing between the first antenna and the second antenna is less than or equal to $\lambda_0/\pi$, where $\lambda_0 = c/f_0$, where c is the speed of light and $f_0$ is a carrier frequency of the first signal.

* * * * *